US008837385B2

(12) United States Patent
Cho et al.

(10) Patent No.: US 8,837,385 B2
(45) Date of Patent: Sep. 16, 2014

(54) METHOD FOR TRANSMITTING AND RECEIVING ACKNOWLEDGMENT IN A WIRELESS COMMUNICATION SYSTEM

(75) Inventors: Hee Jeong Cho, Gyeonggi-do (KR); Ki Seon Ryu, Gyeonggi-do (KR); Young Soo Yuk, Gyeonggi-do (KR); In Uk Jung, Gyeonggi-do (KR); Jin Sam Kwak, Gyeonggi-do (KR); Eun Jong Lee, Gyeonggi-do (KR); Su Nam Kim, Gyeonggi-do (KR); Yong Ho Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 12/756,142

(22) Filed: Apr. 7, 2010

(65) Prior Publication Data

US 2010/0260128 A1 Oct. 14, 2010

Related U.S. Application Data

(60) Provisional application No. 61/175,060, filed on May 4, 2009, provisional application No. 61/173,217, filed on Apr. 28, 2009, provisional application No. 61/173,155, filed on Apr. 27, 2009, provisional application No. 61/172,790, filed on Apr. 27, 2009, provisional application No. 61/168,203, filed on Apr. 9, 2009, provisional application No. 61/167,834, filed on Apr. 8, 2009.

(30) Foreign Application Priority Data

Jul. 2, 2009 (KR) .................. 10-2009-0060158

(51) Int. Cl.
*H04W 4/00* (2009.01)
*H04L 1/18* (2006.01)
*H04L 1/16* (2006.01)
*H04W 74/00* (2009.01)
*H04W 74/08* (2009.01)
*H04W 72/04* (2009.01)

(52) U.S. Cl.
CPC ........ *H04W 74/004* (2013.01); *H04W 74/0833* (2013.01); *H04L 1/1861* (2013.01); *H04L 1/1671* (2013.01); *H04W 72/0406* (2013.01); *H04L 1/1614* (2013.01)
USPC .......................................... 370/329; 370/338

(58) Field of Classification Search
USPC .......... 370/328, 329, 338, 231, 235; 714/748, 714/751, 758
See application file for complete search history.

(56) References Cited

U.S. PATENT DOCUMENTS 5,493,569 A 2/1996 Buchholz et al.
7,548,534 B2 6/2009 Zimmerman et al.
(Continued)

FOREIGN PATENT DOCUMENTS

CN 1882159 12/2006
CN 101155395 4/2008
(Continued)

OTHER PUBLICATIONS (M. Okuda et al., "Consecutive Transmission of Bandwidth Request Indicators." IEEE 802.16 Broadband Wireless Access Working Group, IEEE C802.16m-08/963, Sep. 2008).*

(Continued)

*Primary Examiner* — Afshawn Towfighi
(74) *Attorney, Agent, or Firm* — Lee, Hong, Degerman, Kang & Waimey

(57) ABSTRACT

A method for transmitting and receiving an ACKnowledgment (ACK) in a wireless communication system is disclosed. The method includes transmitting a bandwidth request indicator to a Base Station (BS), and receiving an ACK for the transmitted bandwidth request indicator from the BS, the ACK including a resource start offset field. The resource start offset field indicates an index of a starting resource unit of resources allocated by the ACK.

8 Claims, 6 Drawing Sheets

(56) References Cited

U.S. PATENT DOCUMENTS

| | | | |
|---|---|---|---|
| 7,676,230 B2 | 3/2010 | Kang et al. | |
| 8,031,666 B2 | 10/2011 | Jeon et al. | |
| 8,310,921 B2 | 11/2012 | Cho et al. | |
| 8,503,404 B2 | 8/2013 | Kim et al. | |
| 2003/0124976 A1 | 7/2003 | Tamaki et al. | |
| 2005/0054389 A1 | 3/2005 | Lee et al. | |
| 2006/0159015 A1 | 7/2006 | Seo et al. | |
| 2006/0239241 A1* | 10/2006 | Eom et al. | 370/348 |
| 2007/0201399 A1 | 8/2007 | Lee et al. | |
| 2007/0206531 A1 | 9/2007 | Pajukoski et al. | |
| 2007/0206561 A1 | 9/2007 | Son et al. | |
| 2009/0068944 A1 | 3/2009 | Kang et al. | |
| 2009/0109915 A1* | 4/2009 | Pasad et al. | 370/329 |
| 2009/0137254 A1 | 5/2009 | Vukovic et al. | |
| 2010/0111029 A1 | 5/2010 | Chou et al. | |
| 2010/0220641 A1 | 9/2010 | Son et al. | |
| 2011/0176516 A1 | 7/2011 | Thakore et al. | |
| 2011/0286420 A1 | 11/2011 | Cho et al. | |
| 2012/0026873 A1 | 2/2012 | Spinar et al. | |
| 2012/0147840 A1 | 6/2012 | Chen | |
| 2012/0163321 A1 | 6/2012 | Lee et al. | |
| 2012/0307674 A1 | 12/2012 | Mogre et al. | |

FOREIGN PATENT DOCUMENTS

| | | |
|---|---|---|
| CN | 101207535 | 6/2008 |
| CN | 101400144 | 4/2009 |
| CN | 100546415 | 9/2009 |
| CN | 102144426 | 8/2011 |
| EP | 1940185 | 7/2008 |
| JP | 8-500227 | 1/1996 |
| JP | 9-083544 | 3/1997 |
| JP | 2002-527967 | 8/2002 |
| JP | 2006-135441 | 5/2006 |
| JP | 2008-510380 | 4/2008 |
| JP | 2008-295014 | 12/2008 |
| KR | 10-2005-0029112 | 3/2005 |
| KR | 10-2005-0052124 | 6/2005 |
| KR | 10-2006-0083935 | 7/2006 |
| KR | 10-0703303 | 4/2007 |
| KR | 10-2007-0065549 | 6/2007 |
| KR | 10-2008-0043471 | 5/2008 |
| KR | 1020080054987 | 6/2008 |
| KR | 1020080063594 | 7/2008 |
| KR | 10-0937432 | 1/2010 |
| KR | 10-0975699 | 8/2010 |
| TW | M354286 | 4/2009 |
| WO | 2008/082908 | 7/2008 |
| WO | 2008/096627 | 8/2008 |
| WO | 2008/115699 | 9/2008 |
| WO | 2008/155931 | 12/2008 |
| WO | 2009/035905 | 3/2009 |

OTHER PUBLICATIONS

Cho, et al., "Differentiated Random Access Scheme for Bandwidth Request in IEEE 802.16m Systems", IEEE 802.16 Broadband Wireless Access Working Group, IEEE C802.16m-08/970, Sep. 2008.

H. Cho et al., "Differentiated Random Access Scheme for Bandwidth Request in IEEE 802.16m Systems," IEEE 802.16 Broadband Wireless Access Working Group, IEEE C802.16m-08/970r1, Sep. 2008.

Y. Zhu et al., "Proposed Text Changes to the IEEE 802.16m SDD (802.16m-08/003r6), Section 11.9.2.5 on the Bandwidth Request Channel," IEEE 802.16 Broadband Wireless Access Working Group, IEEE C802.16m-09/0151, Jan. 2009.

M. Okuda et al., "Consecutive Transmission of Bandwidth Request Indicators," IEEE 802.16 Broadband Wireless Access Working Group, IEEE C802.16m-08/963, Sep. 2008.

State Intellectual Property Office of the People's Republic of China Application Serial No. 201080006548.7, Office Action dated Aug. 28, 2013, 6 pages.

The State Intellectual Property Office of the People's Republic of China Application Serial No. 201080006548.7, Office Action dated Mar. 18, 2014, 6 pages.

United States Patent and Trademark Office U.S. Appl. No. 13/147,566, Office Action dated Dec. 20, 2013, 6 pages.

The State Intellectual Property Office of the People's Republic of China Application Serial No. 200980134690.7, Office Action dated Dec. 23, 2013, 5 pages.

United States Patent and Trademark Office U.S. Appl. No. 13/263,329, Office Action dated Jan. 17, 2014, 11 pages.

The State Intellectual Property Office of the People's Republic of China Application Serial No. 201080006570.1, Office Action dated Jul. 2, 2013, 8 pages.

U.S. Appl. No. 13/620,713, Office Action dated May 12, 2014, 8 pages.

* cited by examiner

METHOD FOR TRANSMITTING AND RECEIVING ACKNOWLEDGMENT IN A WIRELESS COMMUNICATION SYSTEM

CROSS-REFERENCE TO RELATED APPLICATIONS

Pursuant to 35 U.S.C. §. 119, this application claims the benefit of earlier filing date and right of priority to Korean Patent Application No. 10-2009-0060158, filed on Jul. 2, 2009, and also claims the benefit of U.S. Provisional Application Ser. Nos. 61/175,060, filed on May 4, 2009, 61/173,217, filed on Apr. 28, 2009, 61/173,155, filed on Apr. 27, 2009, 61/172,790, filed on Apr. 27, 2009, 61/168,203, filed on Apr. 9, 2009, and 61/167,834, filed on Apr. 8, 2009, the contents of which are all incorporated by reference herein in their entirety.

BACKGROUND OF THE INVENTION

1. Field of the Invention

The present invention relates to a wireless communication system, and more particularly, to a method for transmitting and receiving an ACKnowledgment (ACK) in a wireless communication system.

2. Discussion of the Related Art

A random access-based UpLink (UL) Bandwidth Request (BR) procedure and raging procedure in a conventional wireless communication system will be described below.

FIG. 1 is a diagram illustrating a signal flow for a UL BR operation in a conventional wireless communication system.

Referring to FIG. 1, a Mobile Station (MS) selects a BR code from a set of BR codes among ranging codes and transmits the selected BR code to a Base Station (BS) in order to request a UL bandwidth in step S110. If the MS fails to be allocated UL resources until expiration of a timer which is activated to a contention-based reservation timeout or a value T3 after the transmission of the BR code, it retransmits the BR code. Upon successful receipt of the BR code from the MS, the BS allocates UL resources to the MS so that the MS may transmit a Bandwidth Request (BW-REQ) message in the allocated UL resources in step S120. In step S130, the MS transmits a BW-REQ message to the BS in the allocated UL resources. Upon receipt of the BW-REQ message from the MS, the BS allocates UL resources to the MS in step S140 and the MS transmits data in the allocated UL resources to the BS in step S150.

FIG. 2 is a diagram illustrating a signal flow for a ranging procedure in the conventional wireless communication system.

Referring to FIG. 2, an MS selects a ranging code from a set of initial ranging codes among ranging codes and transmits the selected ranging code to a BS, for initial ranging in step S210. Upon successful receipt of the ranging code from the MS, the BS allocates UL resources to the MS, for transmission of a Ranging Request (RNG-REQ) message in step S220. According to the time status of the ranging code, the BS may transmit a Ranging Response (RNG-RSP) message to the MS. If the MS fails to be allocated UL resources or to receive an RNG-RSP message from the BS until expiration of a timer which is activated to a contention-based reservation timeout or a value T3 after the transmission of the ranging code, the MS retransmits the ranging code.

When being allocated UL resources for transmission of an RNG-REQ message, the MS transmits the RNG-REQ message in the allocated UL resources to the BS in step S230 and the BS replies to the MS with an RNG-RSP message in step S240. Besides initial ranging, there are handover ranging and periodic ranging.

A random access-based UL BR procedure and ranging procedure in a future broadband wireless access system will be described below.

FIG. 3 is a diagram illustrating a signal flow for a UL BR procedure in a future broadband wireless access system.

In the future-generation wireless communication system, a BS supports both a 5-step regular BR procedure and a 3-step quick access BR procedure. The 5-step regular BR procedure may be performed independently of the 3-step quick access BR procedure or as a fallback mode of the 3-step quick access BR procedure.

Referring to FIG. 3, in the 3-step quick access BR procedure, an MS transmits a BR indicator that is selected randomly or according to a predetermined rule and a quick access message including UL BR information to a BS in step S310. The BR indicator may be a BR sequence or a BR code, and the UL BR information may include a Station Identifier (STID), a request size, etc.

The BS transmits an ACK/Negative ACK (ACK/NACK) for the BR indicator to the MS in step S320. Upon successful receipt of the BR indicator and the quick access message, the BS allocates UL resources for data transmission to the MS in step S360 and the MS transmits data in the allocated UL resources to the BS in step S370. The MS may transmit additional UL BR information along with the data in step S370.

In the 5-step regular BR procedure, the MS transmits a randomly selected BR indicator to the BS in step S310. The BS transmits an ACK/NACK for the BR indicator to the MS in step S320 and allocates UL resources to the MS by a Code Division Multiple Access (CDMA) allocation Advanced-MAP (A-MAP) Information Element (IE) so that the MS may transmit a BW-REQ message in the allocated UL resources in step S330.

In step S340, the MS transmits a BW-REQ message in the allocated UL resources to the BS. The BS then allocates UL resources to the MS by a UL basic assignment A-MAP IE in step S360 and the MS transmits data in the allocated UL resources to the BS in step S370. The MS may transmit additional UL BR information along with the data in step S370.

FIG. 4 is a diagram illustrating a signal flow for a ranging procedure in the future broadband wireless access system.

Referring to FIG. 4, an MS transmits a ranging indicator to a BS in step S410 and the BS transmits an ACK/NACK for the ranging indicator to the MS in step S420. In step S430, the BS then allocates UL resources for transmission of an RNG-REQ message to the MS. The MS transmits an RNG-REQ message to the BS in step S440 and the BS replies to the MS with an RNG-RSP message in step S450.

As described above, upon receipt of a random access code such as a BR indicator or a ranging indicator from an MS, a BS transmits an ACK/NACK for the random access code to the MS in the broadband wireless access system. Accordingly, there exists a need for minimizing the overhead of ACK/NACK transmission.

SUMMARY OF THE INVENTION

As described above, there exists a need for an ACKnowledgment (ACK) format that minimizes the overhead of ACK transmission for a random access code received from a Mobile Station (MS) in a broadband wireless access system.

Accordingly, the present invention is directed to a method for transmitting and receiving an ACK in a wireless communication system that substantially obviates one or more problems due to limitations and disadvantages of the related art.

An object of the present invention is to provide a method for transmitting and receiving an ACK to minimize the transmission overhead of an ACK being a response to a random access code received from an MS.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving an ACK at an MS in a wireless communication system includes transmitting a bandwidth request indicator to a BS, and receiving an ACK for the transmitted bandwidth request indicator from the BS, the ACK including a resource start offset field. The resource start offset field indicates an index of a starting resource unit of resources allocated by the ACK.

In another aspect of the present invention, a method for transmitting an ACK at a BS in a wireless communication system includes receiving bandwidth request indicators from one or more MSs and transmitting an ACK for the received bandwidth request indicators to the MSs, the ACK including a resource start offset field. The resource start offset field indicates an index of a starting resource unit of resources allocated by the ACK.

The BS may allocate only resources of a fixed size by the ACK.

The BS may receive quick access messages from the one or more MSs, and the ACK may further include a message decoding indicator field indicating decoding statuses of the quick access messages.

The ACK may include a Cyclic Redundancy Check (CRC) masked by a Station Identifier (STID) reserved for the ACK.

In another aspect of the present invention, a method for receiving an ACK at an MS in a wireless communication system includes transmitting a bandwidth request indicator to a BS, and receiving an ACK for the transmitted bandwidth request indicator from the BS, the ACK including a most significant bit (MSB) of start offset field. The MSB of start offset field indicates MSBs of an index of a starting resource unit of resources allocated by the ACK or indicates that resources are not allocated by the ACK.

In a further aspect of the present invention, a method for transmitting an ACK at a BS in a wireless communication system includes receiving bandwidth request indicators from one or more MSs, and transmitting an ACK for the received bandwidth request indicators to the one or more MSs, the ACK including an MSB of start offset field. The MSB of start offset field indicates MSBs of an index of a starting resource unit of resources allocated by the ACK or indicates that resources are not allocated by the ACK.

If the MSB of start offset field indicates the MSBs of the index of the starting resource unit of the resources allocated by the ACK, the ACK may further include a Least Significant Bit (LSB) of start offset of resource field indicating LSBs of the index of the starting resource unit of the resources allocated by the ACK.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

Figure 1:
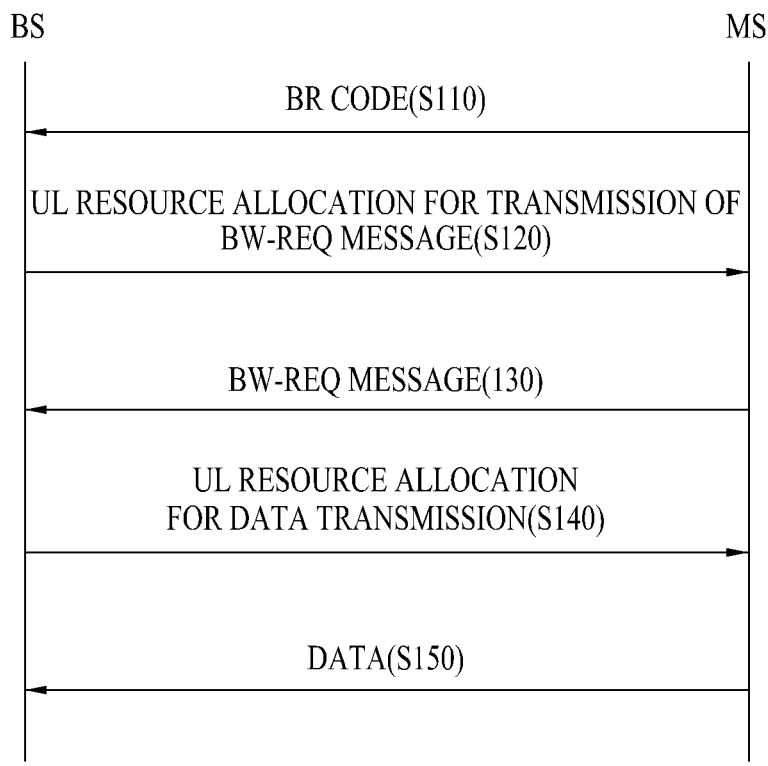
FIG. 1 is a diagram illustrating a signal flow for an UpLink (UL) Bandwidth Request (BR) operation in a conventional wireless communication system.
Figure 2:
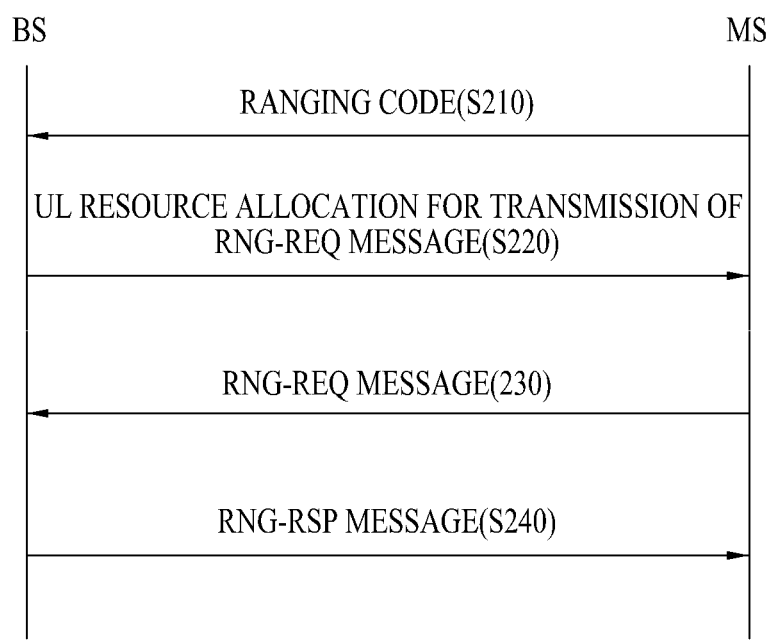
FIG. 2 is a diagram illustrating a signal flow for a ranging procedure in the conventional wireless communication system.
Figure 3:
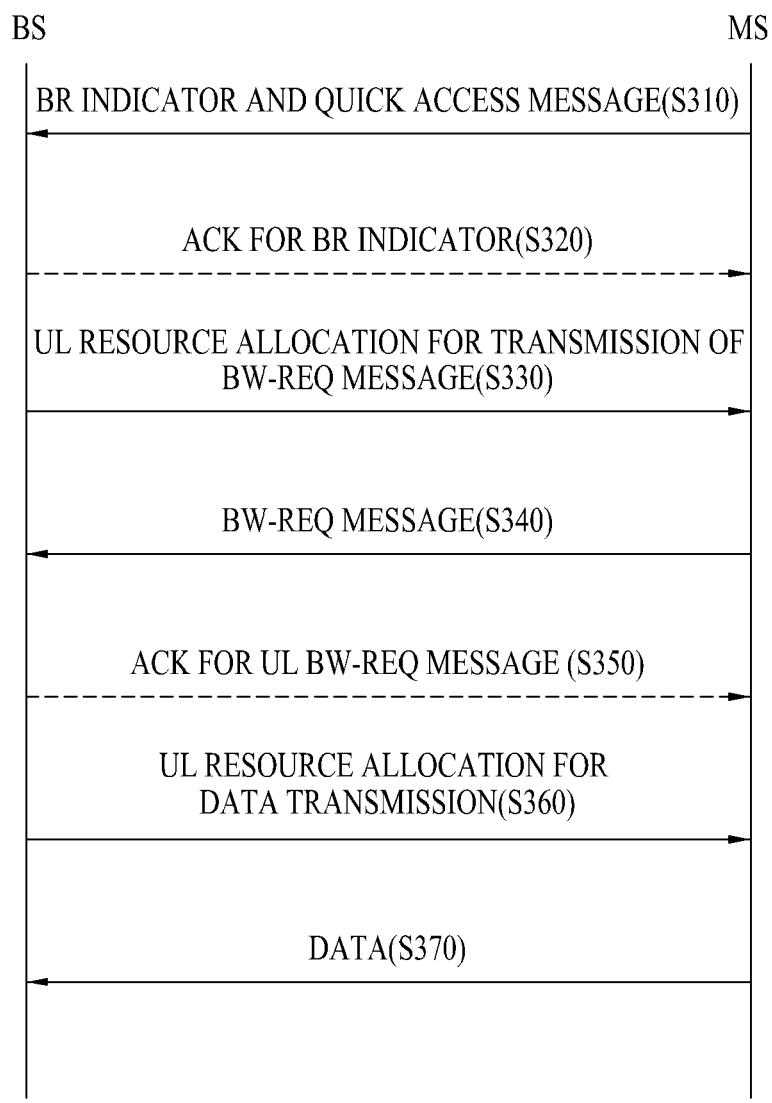
FIG. 3 is a diagram illustrating a signal flow for a UL BR procedure in a future broadband wireless access system.
Figure 4:
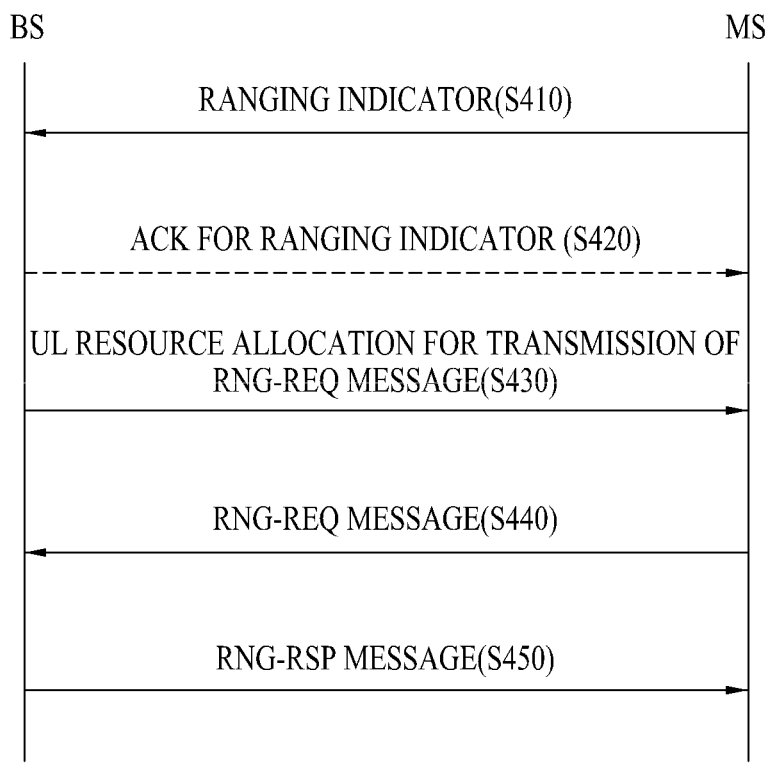
FIG. 4 is a diagram illustrating a signal flow for a ranging procedure in the future broadband wireless access system.
Figure 5:
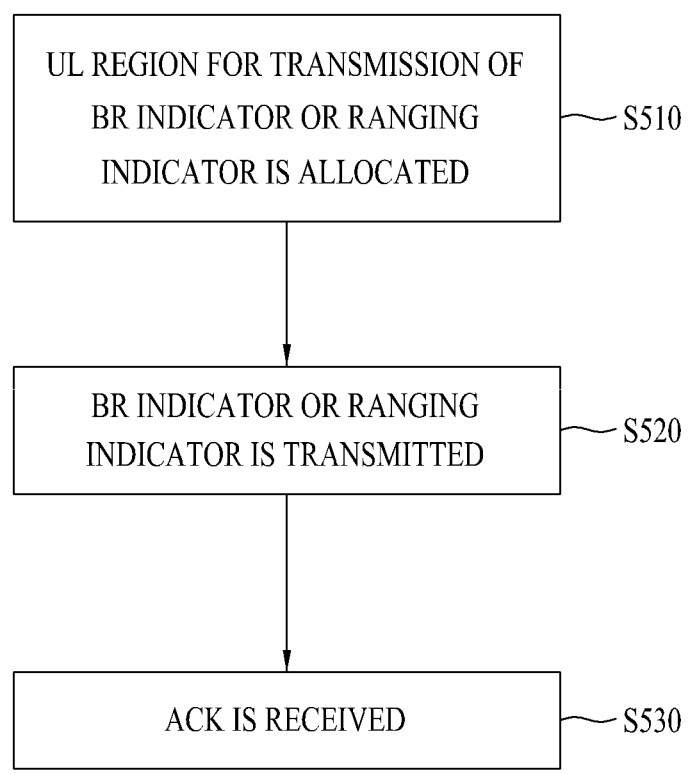
FIG. 5 is a flowchart illustrating a method for receiving an ACKnowledgment (ACK) in a wireless communication system according to an exemplary embodiment of the present invention.
Figure 6:
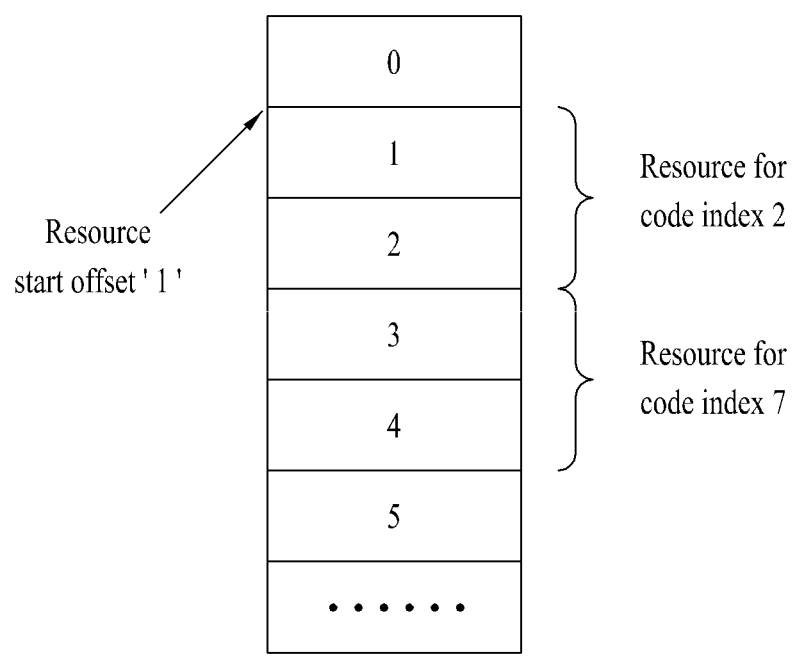
FIG. 6 illustrates an exemplary method for allocating resources when a Resource start offset field is '1'.

With reference to FIGS. 5 and 6, a description will be made of a method for transmitting and receiving an ACKnowledgment (ACK) in a wireless communication system according to an exemplary embodiment of the present invention.

The exemplary embodiment of the present invention proposes an ACK format for minimizing the overhead of transmitting an ACK as a response to a random access code. While a random access code is described in the context of a Bandwidth Request (BR) indicator or a ranging indicator, it is to be understood that the present invention is not limited to a BR indicator and a ranging indicator.

FIG. 5 is a flowchart illustrating a method for receiving an ACK in a wireless communication system according to an exemplary embodiment of the present invention.

Referring to FIG. 5, a Mobile Station (MS) is allocated an UpLink (UL) region for transmission of a BR indicator or a UL region for transmission of a ranging indicator from a Base Station (BS) in step S510 and transmits a BR indicator or a ranging indicator in the allocated UL region in step S520.

The UL region for transmission of a BR indicator is defined separately from a UL region for transmission of a ranging indicator and each of the UL regions includes one or more transmission opportunities. A transmission opportunity is a resource region including one or more resource units, carrying a BR indicator or a ranging indicator. Transmission opportunities may be indexed.

Thus the MS transmits the BR indicator or the ranging indicator during a transmission opportunity to the BS.

In step S530, the BS transmits an ACK for the BR indicator or the ranging indicator to the MS.

The format of an ACK as a response to a BR indicator is different from the format an ACK as a response to a ranging indicator because the ACKs may have different field configurations. Another reason for the different ACK formats is that even the same fields in the ACKs may have different bit sizes since different numbers of codes and different numbers of transmission opportunities are available to the BR indicator and the ranging indicator.

In the exemplary embodiment of the present invention, an ACK format for a BR indicator is proposed. Table 1 below illustrates an ACK format for a BR indicator according to an exemplary embodiment of the present invention.

mation about BR indicators that the BS has successfully received in a specific subframe. Accordingly, the ACK transmitted on a frame basis includes the Frame index field, and the ACK transmitted on a frame basis includes the Frame index field and a Subframe index field indicating the subframe carrying the BR indicators for which the ACK is generated.

When the BS transmits an ACK apart from a position at which it has received BR indicators by a predetermined value known to MSs, the ACK does not need to include Frame index or Subframe index. However, if the predetermined value is specified in frames and an ACK is transmitted on a subframe basis, the ACK should contain Subframe index.

The Frame index field may be replaced with a Frame Bitmap field and the Subframe index field may be replaced with a Subframe Bitmap field.

ACK Bitmap indicates whether a BR indicator has been successfully received in each transmission opportunity defined in the frame or subframe indicated by the ACK. Therefore, the size of ACK Bitmap is equal to the number of transmission opportunities, N_BR_Slots, defined in the frame or subframe indicated by the ACK. Given n transmission opportunities in the frame or subframe indicated by the ACK, if the BS successfully receives one or more BR indicators at a $k^{th}$ transmission, a $k^{th}$ bit of the ACK MAP field is set to 1 and if the BS fails to receive any BR indicator at the $k^{th}$ transmission, the $k^{th}$ bit of the ACK MAP field is set to 0.

As noted from Table 1, the ACK includes Number of Received codes, Code index, Message (MSG) decoding indicator, and Grant indicator, for each transmission opportunity corresponding to a bit set to 1 in the ACK Bitmap field.

TABLE 1

| Syntax | Size (bits) | Notes |
|---|---|---|
| Frame index | | |
| ACK Bitmap | N_BR_Slots | Each bit indicates the decoding status of BR code in the corresponding BR opportunity. 0b0: No BR code is detected, 0b1: At least one code is detected. |
| Resource start offset | TBD | This field is the start offset of the Resource allocation for BR Header. |
| HFA start offset | | This field is the HFA start offset of HARQ Feedback Allocation |
| For (i=0; N_BR_Slots; i++) { | | |
| If (BR-ACK Bitmap[i] == 1) { | | |
|   Number of Received codes (L) | TBD | |
|   For (j=0; j<L; j++) { | | |
|     Code index | 5 | Code index received in the BR opportunity |
|     MSG decoding indicator | 1 | To indicate the decoding status of quick access message |
|     Grant indicator | 1 | To indicate whether grant of BR Header for the code index is included or not. If this bit is set, the UL resource is allocated with fixed size and MCS. |
|   } | | |
| } | | |
| } | | |
| MCRC | 16 | CRC masked by the reserved STID for ACK A-MAP |

Referring to Table 1, the fields of an ACK for a BR indicator according to the exemplary embodiment of the present invention will be described.

Frame Index identifies a frame carrying BR indicators for which the ACK is issued. An ACK is transmitted on a frame basis or on a subframe basis. If an ACK is transmitted on a frame basis, the BS broadcasts an ACK including information about BR indicators that the BS has successfully received in a specific frame, whereas when an ACK is transmitted on a subframe basis, the BS broadcasts an ACK including infor- The ACK Bitmap field may be configured so as to indicate whether a quick access message has been received successfully during each transmission opportunity in the frame or subframe indicated by the ACK as well as so as to indicate whether a BR indicator has been received successfully during each transmission opportunity in the frame or subframe indicated by the ACK. For this purpose, two bits are needed for each transmission opportunity in the frame or subframe. As a consequence, the size of the ACK Bitmap field is twice the number of transmission opportunities, N_BR_Slots, in the frame or subframe indicated by the ACK.

If two bits for a transmission opportunity of the frame or subframe in the ACK Bitmap field are "0b00", this implies that neither BR indicators nor quick access messages have been received successfully in the transmission opportunity. If the two bits for the transmission opportunity are "0b01", this implies that m BR indicators have been received successfully and no quick access message has been received successfully in the transmission opportunity. If the two bits for the transmission opportunity are "0b10", this implies that m BR indicators have been received successfully and 1 (m≠1) quick access messages have been received successfully in the transmission opportunity. If the two bits for the transmission opportunity are "0b01", this implies that m BR indicators and m quick access messages have been received successfully.

For each transmission opportunity for which two bits are set to '01', '10' or '11' in the ACK Bitmap field, the ACK includes Number of Received codes, Code index, MSG decoding indicator, and Grant indicator. MSG decoding indicator may not be included in the ACK, for each transmission opportunity for which two bits are set to '01' or '11' in the ACK Bitmap field. MSG decoding indicator indicates whether the BS has successfully received a quick access message that was transmitted along with a BR indicator. If two bits for a transmission opportunity are '01', this means that the BS has not received any quick access message and if the two bits are '11', this means that the BS has received as many quick access messages as successfully received BR indicators. That's why MSG decoding indicator may not be included in the ACK, for each transmission opportunity for which two bits are set to '01' or '11'.

Instead of the ACK Bitmap field, the ACK may include Opportunity index fields and status indicator fields.

The Opportunity index fields specify the indexes of transmission opportunities in the frame or subframe, and the status indicator fields indicate whether a BR indicator has been received successfully in each transmission opportunity. That is, there is a status indicator field for each Opportunity index field and the status indicator field is set to '1' if the BS has received one or more BR indicators in the transmission opportunity indicated by the Opportunity index field and to '0' if the BS has received no BR indicator in the transmission opportunity. For each transmission opportunity for which a status indicator field is set to '1', the ACK includes Number of Received codes, Code index, MSG decoding indicator, and Grant indicator.

Resource start offset indicates the index of the starting resource unit of resources allocated to MSs. The BS may allocate resources to part or all of MSs from which the BS has received BR indicators successfully, by the ACK. When the BS allocates resources by the ACK, Grant indicator is set to '1'. Therefore, the BS sequentially allocates resources to the MSs that transmitted BR indicators for which grant indicators are set to 1s, starting from the starting point indicated by the Resource start offset field. The order of resource allocation to the MSs may be determined in a predetermined rule or in a method known to both the BS and the MSs. For example, the resources may be allocated to the MSs in an ascending or descending order of the indexes of the BR indicators transmitted by the MSs.

FIG. 6 illustrates an exemplary method for allocating resources when the Resource start offset field is set to 1.

Referring to FIG. 6, the BS allocates resources sequentially to MSs in an ascending order of the indexes of BR indicators that the MSs transmitted to the BS, starting with a resource unit with index 1. Specifically, the BS allocates resources to MSs that transmitted BR indicators for which Grant indicators are set to is in an ascending order of the code indexes of the BR indicators.

On the assumption that there are two BR indicators with code indexes 2 and 7, for which Grant indicators are is in the ACK and the BS allocates two resource units to each MS, the BS allocates resource unit 1 and resource unit 2 to the MS that transmitted a BR indicator with code index 2 and resources unit 3 and resource unit 4 to the MS that transmitted a BR indicator with code index 7.

The Resource start offset field may be optimized with two Most Significant Bits (MSBs) of a resource start offset in order to reduce overhead. Table 2a illustrates a format of an ACK that is generated for BR indicators, when the Resource start offset field is optimized using two MSBs.

TABLE 2a

| Fields | Notes |
|---|---|
| ACK A-MAP IE( ){ | |
| A-MAP Type | |
| ACK Bitmap | |
| MSB of start offset | This field is MSB of the start offset of the Resource allocation. |
| | 0b00, 0b01, 0x10: MSB of the start offset of the resource allocation |
| | 0b11: There is no grant indicator exists |
| If(MSB of start offset!=0b11){ | |
| LSB of start offset of Resource | This field is LSB of the start offset of the Resource allocation |
| HFA start offset | |
| } | |
| For (i=0; N_Slots; i++) { | |
| If (ACK Bitmap[i] == 1) { | |
| Number of Received codes (L) | The number of code indices included in this ACK A-MAP IE. |
| For (j=0; j<L; j++) { | |
| Code index | Code index received in the opportunity |
| ...... | |
| If(MSB of start offset!=0b11){ | |
| Grant indicator | To indicate whether grant of BR Header for the code index is included or not |
| | If this bit is set, the UL resource is allocated with fixed size and MCS. |
| } | |
| } | |

TABLE 2a-continued

| Fields | Notes |
|---|---|
| } } MCRC } | |

In a frequency band of 20 MHz, there are up to 96 Logical Resource Units (LRUs). Hence, given 7 bits to represent a resource start offset, the Resource start offset field is set to "0b0000000" for a resource start offset corresponding to LRU 0. If the resource start offset is LRU 95, the Resource start offset field is set to "0b1011111". Since the Resource start offset field ranges from "0b0000000" to "0b1011111", there is no case in which the MSBs are '11'.

Accordingly, if resources are not allocated by the ACK, the BS sets the MSBs of the Resource start offset field to '11', excluding the remaining bits of the Resource start offset field and the Grant indicator field from the ACK, thereby reducing ACK overhead.

Referring to Table 2a, the MSB of start offset field indicates the two MSBs of a resource start offset and the LSB of start offset of Resource field indicates the five LSBs of the resource start offset. As illustrated in Table 2a, the LBS of start offset of Resource field is included only when the MSB of start offset field is not '11'. Also, the Grant indicator field is included in the ACK only when the MSB of start offset field is not '11'.

When the MSB of start offset field is '11', MSs also determine that the ACK does not include the LSB of start offset of Resource field and the Grant indicator field.

Alternatively or additionally, to reduce overhead, the Resource start offset field may be optimized using a 1-bit flag. Table 2b illustrates the format of an ACK for BR indicators when the Resource start offset field, an HFA start offset field, and the grant indicator field are optimized using a 1-bit flag.

The BS allocates the resources of one, two or three UL subframes by one UL A-MAP IE region according to a DL-to-UL ratio (8:0, 6:2, 5:3, 4:4 or 3:5) and the number of subframes per A-MAP, $N_{subframe,A\text{-}MAP}$. If a UL A-MAP IE region occurs in every frame, the number of subframes per A-MAP, $N_{subframe,A\text{-}MAP}$ is 1. If a UL A-MAP IE region occurs in every second frame, the number of subframes per A-MAP, $N_{subframe,A\text{-}Map}$ is 2. For example, if the DL-to-UL ratio is 3:5 and $N_{subframe,A\text{-}MAP}$ is 1, a first UL A-MAP IE region includes resource information about a first UL subframe (a first UL subframe of the first UL A-MAP IE region), a second UL A-MAP IE region includes resource information about a second UL subframe (a first UL subframe of the second UL A-MAP IE region) and a third UL subframe (a second UL subframe of the second UL A-MAP IE region), and a third UL A-MAP IE includes resource information about a fourth UL subframe (a first UL subframe of the third UL A-MAP IE region) and a fifth UL subframe (a second UL subframe of the third UL A-MAP IE region). Therefore, the BS explicitly includes allocation relevance, that is, information indicating a subframe of a UL A-MAP IE region, relevant to a resource assignment in the ACK, or a subframe of a UL A-MAP IE region relevant to a resource assignment in the ACK should be predefined, for example, as a first subframe.

HARQ Feedback Allocation (HFA) start offset is a field needed when HARQ is applied to a message transmitted in allocated resources. The BS notifies the MS whether it has received the message successfully by an HFA. Hence, like the Resource start offset field, the BS sequentially allocates TABLE 2b

| Fields | Notes |
|---|---|
| ACK A-MAP IE( ){ A-MAP Type ACK Bitmap Flag | 0b0: There is no grant 0b1: There is grant |
| If(flag==0b1){ Resource start offset HFA start offset } | This field is the start offset of the Resource allocation This field is the start offset of the HFA |
| For (i=0; N_Slots; i++) { If (ACK Bitmap[i] == 1) { Number of Received codes (L) For (j=0; j<L; j++) { Code index ...... | The number of code indices included in this ACK A-MAP IE. Code index received in the opportunity |
| If(flag ==0b1){ Grant indicator | To indicate whether grant of BR Header for the code index is included or not If this bit is set, the UL resource is allocated with fixed size and MCS. |
| } } } } } MCRC } | |

HARQ feedback resources to MSs that transmitted BR indicators for which Grant indicators are set to 1s, starting from a starting point indicated by the HFA start offset field. The order of allocating the HARQ feedback resources to the MSs is set according to a predetermined rule or preset between the BS and the MSs. For example, the BS may sequentially allocate the HARQ feedback resources to the MSs in an ascending or descending order of the indexes of the BR request indicators transmitted by the MSs. On the other hand, if the HFA start offset is preset, for example, to 0 between the BS and the MSs, the HFA start offset field may not be included in the ACK.

Number of Received codes indicates the number of BR indicators that the BS has successfully decoded in an associated transmission opportunity. As illustrated in Table 1, if a transmission opportunity included in the frame or subframe indicated by the ACK has a bit set to 1 in the ACK Bitmap field, the ACK includes the Number of Received codes field for the transmission opportunity.

The ACK further includes a Code index field, an MSG decoding indicator field, and a Grant indicator field for each of the BR request indicators that the BS has succeeded in decoding in each transmission opportunity.

The Code index field indicates the code index of a BR indicator received in the transmission opportunity. The BS may arrange the indexes of BR indicators in an ascending or descending order.

The MSG decoding indicator field indicates whether the BS has successfully decoded a quick access message that an MS transmitted along with the BR indicator. That is, if the BS has successfully decoded the quick access message, the MSG decoding indicator field is set to '1'. If the BS has failed to decode the quick access message, the MSG decoding indicator field is set to '0'. In the latter case, the BS and the MS transition from the 3-step quick access BR procedure to the 5-step regular BR procedure. That is, the BS allocates resources for transmission of a BW-REQ message to the MS and the MS transmits the BW-REQ message to the BS in the allocated resources. Then the BS allocates resources to the MS and the MS transmits data in the allocated resources to the BS.

Information indicating whether quick access messages have been successfully decoded may be represented as illustrated in Table 3. Table 3 illustrates part of an exemplary BR indicator.

TABLE 3

| Fields | Notes |
|---|---|
| Number of Received codes (L) | |
| Success of detected code # | Total number of detected BR codes transmitted along with successfully decoded quick access messages |
| For (n=0; n<Success detected code #;n++){ | |
| Code index | Index of detected BR code transmitted along with successfully decoded quick access message |
| } | |
| Fail detected code # | Total number of detected BR codes transmitted along with failed quick access messages |
| For (n=0; n<Fail detected code #;n++){ | |
| Code index | Index of detected BR code transmitted along with failed quick access message |
| } | |

In Table 3, Success detected code # indicates the number of BR indicators transmitted along with quick access messages that have been successfully decoded at the BS. The ACK includes the code indexes of these BR indicators transmitted along with the successfully decoded quick access messages.

Fail detected code # indicates the number of BR indicators transmitted along with quick access messages that have not been successfully decoded at the BS. The ACK includes the code indexes of these BR indicators transmitted along with the failed quick access messages.

Grant indicator indicates whether the BS allocates resources to an MS that transmitted a BR indicator successfully received at the BS, by the ACK. If the BS allocates resources to the MS by the ACK, the Grant indicator field is set to '1' and if the BS does not allocate resources to the MS by the ACK, the Grant indicator field is set to '0'. The BS allocates resources of a fixed size by the ACK. Specifically, when allocating resources for transmission of a BW-REQ message or an RNG-REQ message, the BS may use the ACK. Then the MS modulates and encodes transmission data in a predetermined Modulation and Coding Scheme (MCS) using the resources allocated by the ACK from the BS.

A Masked Cyclic Redundancy Check (MCRC) is a CRC masked by a reserved STID.

The BS may reserve an STID for an ACK to be issued for each of a BR indicator and a ranging indicator carried in a frame, a subframe, or a transmission opportunity. That is, The CRC of an ACK as a response to a BR indicator is masked by an STID reserved for a frame, subframe or transmission opportunity.

Alternatively or additionally, the BS may reserve an STID for an ACK for each of a BR indicator and a ranging indicator. That is, the CRC of an ACK for a BR indicator is masked by an STID reserved for the BR indicator and the CRC of an ACK for a ranging indicator is masked by an STID reserved for the ranging indicator.

Upon receipt of an ACK from the BS, an MS first checks the MCRC of the ACK. If the MS transmitted a BR indicator to the BS, the MS checks only an ACK masked by an STID reserved for an ACK being a response to a BR indicator. If the MS transmitted a ranging indicator to the BS, the MS checks only an ACK masked by an STID reserved for an ACK being a response to a ranging indicator.

If an STID is reserved for a frame, a subframe or a transmission opportunity carrying an indicator, the MS checks only an ACK masked by the STID.

For example, if an STID is reserved for each frame, an MS that transmitted a BR indicator in one of transmission opportunities defined in a third frame checks only an ACK masked by an STID reserved for the third frame, for the usage of a BR indicator.

Besides the fields of Table 1, the ACK may further include a Time duration field and an Extended ACK field.

If Grant indicator is '0', the Time duration field may be included in the ACK, indicating when the BS allocates resources. For instance, if the Time duration field is 30 ms, this implies that the BS will allocate resources to the MS within 30 ms. The MS may reset an associated timer such as a BR timer or a ranging timer to the value set in the Time duration field.

The Extended ACK field indicates whether the BS will transmit an additional ACK because one ACK does not include all needed information. The Extended ACK field may exist for every transmission opportunity or for a whole ACK. Table 4 illustrates one Extended ACK field that exists for every transmission opportunity, and FIG. 5 illustrates one Extended ACK field that exists for a whole ACK.

TABLE 4

| Fields | Notes |
| --- | --- |
| ACK Bitmap<br>  For (i=0; N__Slots; i++) {<br>    If (ACK Bitmap[i] == 1) {<br>    Extended ACK<br>    Number of Received codes (L)<br>    ....<br>} | <br><br><br><br>The number of code indices included in this ACK. |

Referring to Table 4, if an ACK is not so sufficient as to include all ACK contents for a transmission opportunity, such as code indexes, message decoding indicators, etc., the Extended ACK field is set to '1' for the transmission opportunity. The remaining ACK contents that are not carried in the ACK are transmitted in an additional ACK. If the Extended ACK field is '0', this means that all ACK contents are included in the ACK. Thus the additional ACK is not transmitted for the transmission opportunity.

TABLE 5

| Fields | Notes |
| --- | --- |
| ACK Bitmap<br>Extended ACK<br>For (i=0; N__Slots; i++) {<br>If (ACK Bitmap[i] == 1) {<br>Number of Received codes (L)<br>....<br>} | <br><br><br><br>The number of code indices included in this ACK. |

If an additional ACK includes an ACK Bitmap field covering all transmission opportunities, the ACK bitmap field should be set to be identical to the ACK Bitmap field of an initially transmitted ACK. If a bit of the ACK Bitmap field corresponding to a transmission opportunity is 1 and no code index for the transmission opportunity is received in a DL frame or subframe carrying the ACK, an MS determines that it has failed to receive the ACK, considering it as an implicit ACK.

Now a description will be made of how an ACK is transmitted.

The BS may transmit an ACK by an A-MAP IE, a broadcast message, or both.

Considering that a limited amount of information can be carried in one A-MAP IE, the BS may select an ACK transmission scheme according to the amount of ACK contents to thereby reduce the decoding complexity of the A-MAP IE.

When the BS transmits an ACK in an A-MAP IE, the A-MAP IE basically includes an A-MAP Type and an MCRC. An A-MAP IE carrying an ACK is called an ACK A-MAP IE, an A-MAP IE carrying a BR indicator is called a BR A-MAP IE, and an A-MAP IE carrying a ranging indicator is called a Ranging A-MAP IE.

If the BS transmits an ACK by a broadcast message, the BS transmits an A-MAP IE specifying the position of resources used to transmit the broadcast message. The A-MAP IE is masked by a reserved STID.

If the BS transmits an ACK by both an A-MAP IE and a broadcast message, it transmits some fields of ACK contents in the ACK A-MAP IE and the other fields of the ACK contents in the broadcast message. The ACK contents delivered in the ACK A-MAP IE may vary with the number of ACK contents. For example, the ACK A-MAP IE may carry Frame index, ACK Bitmap, transmission opportunity indexes, and state indicators, whereas the broadcast message may carry the remaining fields.

The ACK A-MAP IE may specify the transmission position of the broadcast message. When the ACK is transmitted at a time point spaced from the time of reception of a BR indicator transmitted by an MS by a predetermined value known to both the BS and the MS, the ACK A-MAP IE and the broadcast message may be transmitted at the same time, or the ACK A-MAP IE may be transmitted at a specific time point, followed by the broadcast message.

As is apparent from the above description, the overhead of an ACK can be minimized by optimizing fields of the ACK according to the exemplary embodiments of the present invention.

The exemplary embodiments of the present invention may be achieved by various means, for example, hardware, firmware, software, or a combination thereof. In a hardware configuration, the methods for transmitting control information in a wireless communication system according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for updating a location in a wireless communication system according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for receiving an acknowledgment (ACK) at a Mobile Station (MS) in a wireless communication system, the method comprising:

transmitting a bandwidth request indicator to a base station; and receiving an ACK for the transmitted bandwidth request indicator from the base station, the ACK including a first start offset field, which contains either most significant bits (MSBs) of a start offset of resource allocation allocated by the ACK or a value indicating that there is no resource allocation in the ACK, wherein the ACK further includes a second start offset field, which contains least significant bits (LSBs) of the start offset of the resource allocation if the first start offset value contains the MSBs of the start offset of the resource allocation, wherein the ACK does not include the second start offset field if the first start offset value contains the value indicating that there is no resource allocation in the ACK.

2. The method according to claim 1, wherein only resources of a fixed size are allocated by the ACK.

3. The method according to claim 1, wherein the ACK further includes a Cyclic Redundancy Check (CRC) masked by a predetermined value reserved for the ACK.

4. The method of claim 1, wherein the ACK further includes a HARQ feedback allocation (HFA) start offset field to indicate a HFA start offset of HARQ feedback allocation, only if the first start offset value contains the MSBs of the start offset of the resource allocation.

5. A method for transmitting an acknowledgment (ACK) at a Base Station (BS) in a wireless communication system, the method comprising:
   receiving one or more bandwidth request indicators from a mobile station; and
   transmitting the ACK for the received bandwidth request indicators to the mobile station, the ACK including a first start offset field, which contains either most significant bits (MSBs) of a start offset of resource allocation allocated by the ACK or a value indicating that there is no resource allocation in the ACK,
   wherein the ACK further includes a second start offset field, which contains least significant bits (LSBs) of the start offset of the resource allocation if the first start offset value contains the MSBs of the start offset of the resource allocation,
   wherein the ACK does not include the second start offset field if the first start offset value contains the value indicating that there is no resource allocation in the ACK.

6. The method according to claim 5, wherein only resources of a fixed size are allocated by the ACK.

7. The method according to claim 5, wherein the ACK further includes a Cyclic Redundancy Check (CRC) masked by a predetermined value reserved for the ACK.

8. The method of claim 5, wherein the ACK further includes a HARQ feedback allocation (HFA) start offset field to indicate a HFA start offset of HARQ feedback allocation, only if the first start offset value contains the MSBs of the start offset of the resource allocation.

* * * * *